(12) United States Patent
Collomb et al.

(10) Patent No.: US 7,483,385 B2
(45) Date of Patent: Jan. 27, 2009

(54) PROCESS FOR MONITORING THE QUALITY OF SERVICE IN A TELECOMMUNICATION NETWORK AND APPARATUS FOR THE SAME

(75) Inventors: Jean-Michel Collomb, Grasse (FR); Chirstophe Laye, Grasse (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 768 days.

(21) Appl. No.: 10/811,215

(22) Filed: Mar. 26, 2004

(65) Prior Publication Data

US 2005/0213509 A1 Sep. 29, 2005

(51) Int. Cl.
*H04J 1/16* (2006.01)
*H04L 12/28* (2006.01)

(52) U.S. Cl. ...................... 370/252; 370/410
(58) Field of Classification Search .................. 370/252, 370/410

See application file for complete search history.

(56) References Cited

U.S. PATENT DOCUMENTS

| | | | |
|---|---|---|---|
| 6,898,188 B1 * | 5/2005 | Hamami ...................... 370/252 |
| 6,901,079 B1 * | 5/2005 | Phadnis et al. .............. 370/466 |
| 7,068,645 B1 * | 6/2006 | Phadnis et al. .............. 370/352 |
| 7,227,865 B2 * | 6/2007 | Shaheen et al. ......... 370/395.21 |
| 2002/0041590 A1 * | 4/2002 | Donovan ..................... 370/352 |
| 2002/0120760 A1 | 8/2002 | Kimchi et al. |
| 2003/0035401 A1 * | 2/2003 | Shaheen et al. ............. 370/341 |
| 2003/0115332 A1 * | 6/2003 | Honeisen ..................... 709/227 |
| 2003/0227907 A1 * | 12/2003 | Choi et al. ................... 370/352 |
| 2004/0047437 A1 * | 3/2004 | Hamiti et al. ............... 375/326 |
| 2005/0094623 A1 * | 5/2005 | D'Eletto ..................... 370/352 |

FOREIGN PATENT DOCUMENTS

EP 1460799 A1 9/2004

OTHER PUBLICATIONS

Rulz, Pedro M., et al., "Improving User-Perceived QoS in Mobile and Wireless IP Networks Using Real-Time Adaptive Multimedia Applications", 13th IEEE International Symposium on Personal Indoor and Mobile Radio Communications, PIMRC 2002, vol. 3, No. 15, Sep. 2002.

* cited by examiner

*Primary Examiner*—Andrew Lee

(57) ABSTRACT

A Process for monitoring the quality of service of the communication over an Internet or intranet network, said process being executed in a end-user terminal and comprising the steps of:

establishing a session between a first end-user terminal and a service or a second end-user terminal via a signaling plane; characterized in that it further comprises the steps of:

monitoring the quality of service of the communication during said session;

using said signaling plane for transmitting information representative of said quality of service during said session, whereby all parties share the same information.

The process is well adapted to the known SIP protocol and allow the end-users of the network to share the same QoS information relating to the communication.

18 Claims, 4 Drawing Sheets

PROCESS FOR MONITORING THE QUALITY OF SERVICE IN A TELECOMMUNICATION NETWORK AND APPARATUS FOR THE SAME

TECHNICAL FIELD OF THE INVENTION

The invention relates to telecommunications and, more particularly, to processes for monitoring quality of service over a telecommunication network and related apparatus and computer programs.

BACKGROUND ART

New services are constantly being made available with the development of telecommunication networks and also that of the Internet. A new impetus for the emergence of new services has resulted from the convergence of packet-based networks with circuit-based networks, such as the traditional Public Switched Telephone Network (PSTN).

It can be observed that the traditional distinction between circuit-based networks—being at the core of traditional telecommunications—and packet-based networks which are at the heart of the Internet network, is disappearing. In the latest developments, the concept of session is being integrated into packet-based networks. Many applications and new services which are available to customers—and also those which will be offered in the near future—are based on the creation and the management of a session. Such a session allows an exchange of data between different participants who are reachable through their address and who can communicate through a wide range of different terminals, such as personal computers, Personal Document Assistant (PDA), portable computers, cellular telephones, fixed telephones, Universal Mobile Telecommunications System (UTMS) terminals, for instance.

Substantial research and investigations have been carried out in order to define the concept of session in the traditional Internet network. Some of this work was carried out within the frame of the Internet Engineering Task Force (IETF) and have lead to the Session Initiation Protocol (SIP) which ties together the PSTN and the Internet.

SIP is the core protocol enabling the setting up of conferencing, telephony, multimedia and other types of communication sessions on the Internet. It is expected to be at the heart of future high-quality voice sessions over packet networks, including wireless networks. With the development of the SIP protocol, there is provided the possibility of real time multimedia sessions, including voice, video and data.

More information concerning the SIP protocol can be found in RFC 3261 "SIP: Session Initiation Protocol". Extensions to SIP are being provided within the IETF in http://www.ietf.org/ids.by.wg/sip.html As a wider variety of telecommunications services are offered to customers of the era of information, including services based on the Web, multimedia services involving video and audio streaming, more and more attention is being directed to the general problem of the Quality of Service (QoS).

Traditional Internet service providers and, more generally, the companies handling the telecommunication networks have already at least partially addressed the problem of measuring the actual quality of service offered to their customers and, therefore, some techniques are already known.

A first technique, illustrated in FIG. 1, is based on the use of a passive probe 3 which is piece of specialized equipment that is installed between two particular communicating nodes 1 and 2 within a network 10. Such a passive probe is designed to monitor the traffic between the two nodes. By observing a certain number of parameters, and particularly the loss of packets, passive probe 3 can track the quality of the communication and can report a QoS measure to the service provider.

A second technique is based on the use of an active probe, such as active probe 4 of FIG. 2 which—contrary to the passive probes—is designed to generate additional traffic and behave like an end-user generating traffic. For this reason, such active probes are also called end-user simulators which can, again, be used for tracking the quality of service of the communication as the packets are being conveyed throughout the network.

A third technique which is also known to the service operators involves processing the information provided by standard management interfaces (log files for Standard Network Management Protocols, for instance) in the network and which are constantly updated.

While the known techniques do provide means to measure the quality of service within a communication network, they are generally reserved for use by service or network operators. They cannot normally be used at the level of the user who, certainly, may have a strong interest in determining the precise measurement of the quality of service which they are experiencing, and for which they will be charged.

SUMMARY OF THE INVENTION

In at least preferred embodiments, the present invention provides a process for monitoring the quality of service of the communication over an Internet or intranet network which is executed in a end-user terminal and which comprises the steps of establishing a session between a first end-user terminal and a system offering a service or a second end-user terminal via a signaling plane; and monitoring the quality of service of the communication during said session; transmitting to all communicating parties information representative of said quality of service via said signaling plane.

By using the signal plane for the transmission of QoS statistics it can be seen that the transmission of such statistics becomes substantially independent of the type of media which is exchanged. This simplifies the monitoring process. Further, there is provided the possibility of real time measurement of the QoS of the session. In particular, in embodiments where the process is fully-compliant with the SIP protocol, the service provider and end-users will be given the possibility to share the same QoS information in a very flexible way. Since the QoS information is transmitted through the signaling plane—and not through the media or data path as in the traditional RTP and RTCP protocol, for instance, a very flexible monitoring process is achieved, and this irrespectively of the particular media transport involved.

In a preferred embodiment, the information representative of said quality of service comprises signaling parameters and media transmission quality parameters. The signaling parameters include a parameter representative of the time taken between one invite or, more generally the time for the "caller" to contact the "callee", is transmitted to said first proxy and said proxy forwards it to said second proxy. Further, the signal parameters includes a parameter which is representative of the time between one invite and the resulting ringing signal for this invite.

In addition, the QoS statistics can include parameters representative of the quality of transmission of voice signals. In one such embodiment, the voice is transmitted through RCP and RTCP protocols and said quality of service comprises parameters extracted from said RTCP protocol, and the quality of service comprises parameters representative of the jitter of the voice transmission, and/or the loss of packets in the transmission of voice.

The invention also enables the provision of a new end-user terminal—and computer programs for use therein—such as a personal computer, a Personal Document Assistant (PDA), a portable computer, a cellular telephone, a fixed telephone or a Universal Mobile Telecommunications System (UTMS) terminal, which can exchange QoS statistics with other parties including other end-user terminals.

In another aspect, the invention provides a process for monitoring the quality of service of a communication through a communication network, said process being executed in a proxy server. The process can comprise the steps of: extracting QoS information representative of measured quality of service measured at one or more session endpoints in one or more messages used in set-up or teardown of a session; processing said extracted QoS data, in a Systems management application, for instance, to produce displayable QoS parameters and displaying said parameters to a user via a user interface. Also provided is a proxy server comprising means to monitor QoS using the above described process and a computer program product, such as a systems management application, comprising program code elements for doing the same.

DESCRIPTION OF THE DRAWINGS

An embodiment of the invention will now be described, by way of example only, with reference to the accompanying drawings, wherein.

DESCRIPTION OF THE PREFERRED EMBODIMENT OF THE INVENTION

Figure 1:
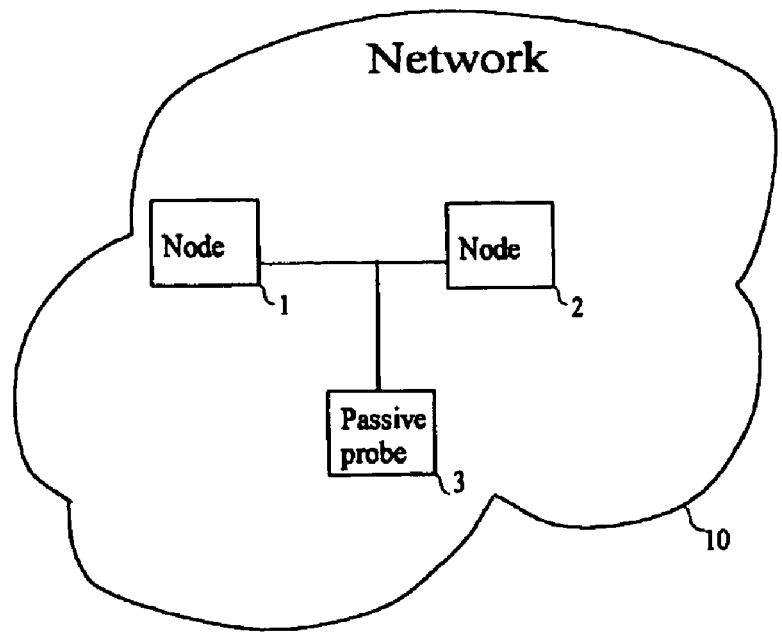
FIG. 1 illustrates a first prior art technique based on a passive probe.
Figure 2:
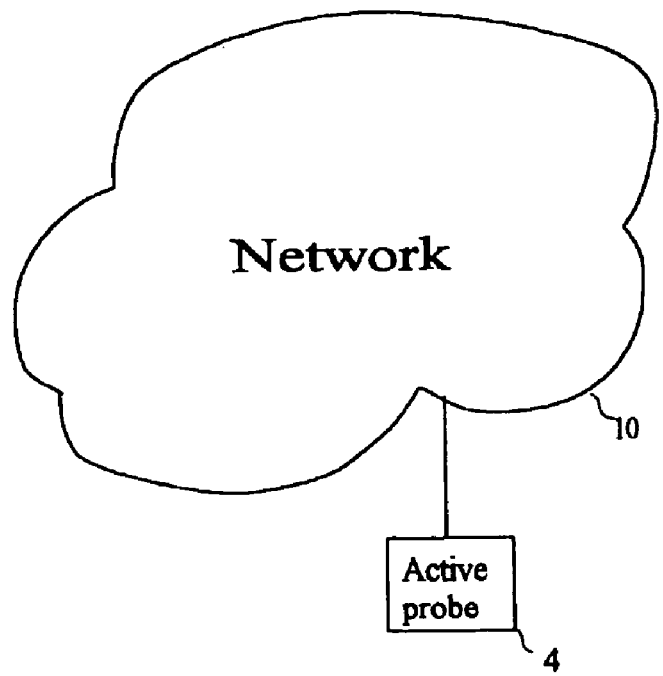
FIG. 2 illustrates a second prior art technique which is based on the use of an active probe generating traffic to determine the quality of service within a network.
Figure 3:
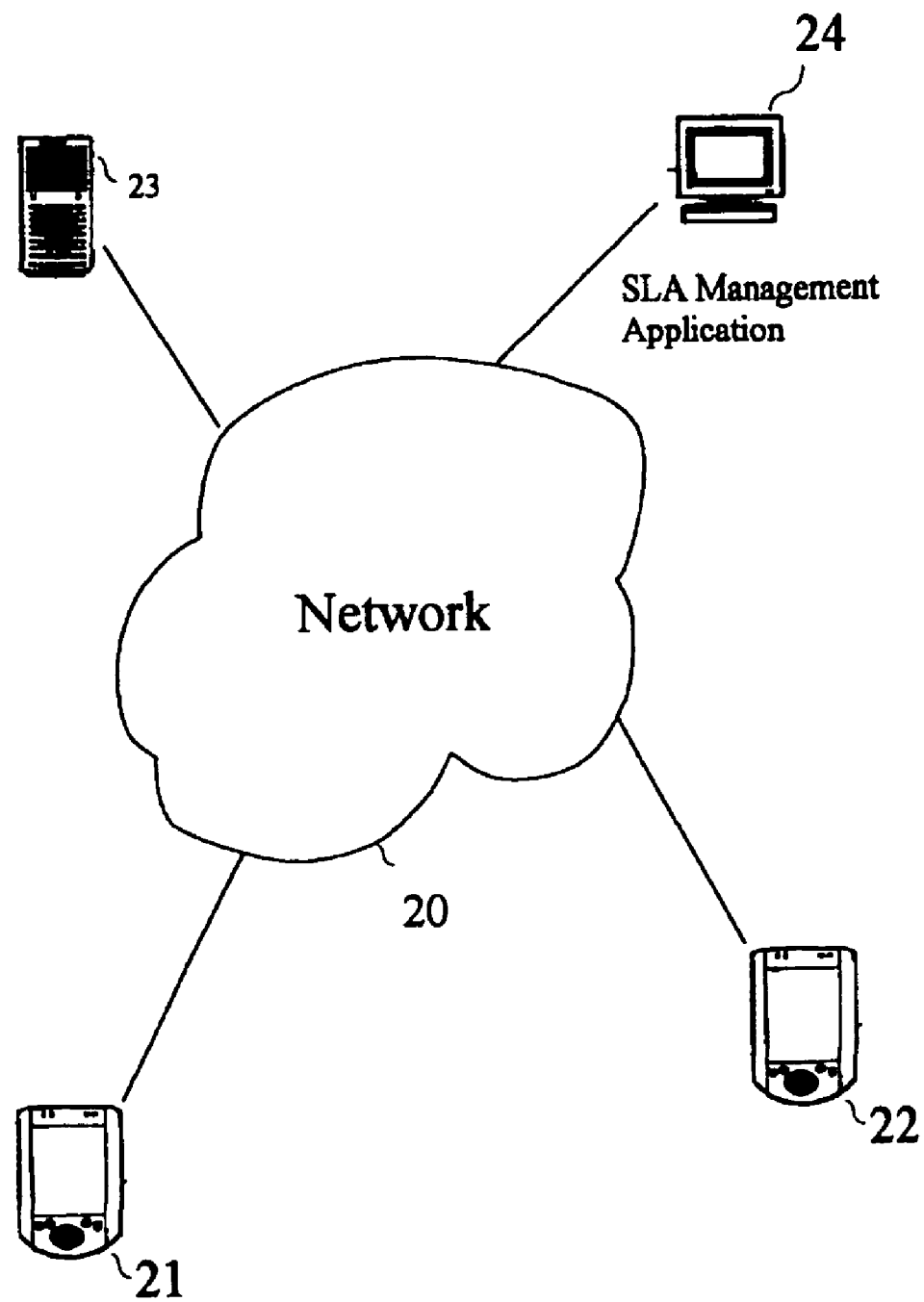
FIG. 3 is a schematic diagram illustrating a network within which a process is executed in order to monitor the quality of service experienced by the user.

With respect to FIG. 3 there will now be described a preferred embodiment of a process for measuring and monitoring the quality of service of a communication in a telecommunication network 20. Communication network 20 can be, for instance, a next generation network (NGN) which provides, in addition to the traditional internet services, e.g. web browsing or email, for instance, additional real time multimedia sessions, including voice, video and data.

Services provided to an end-user terminal 21 may include services offered by a dedicated server 23 as well as multimedia sessions with a second end-user terminal 22. A Service Level Agreement Management application in terminal 25 may be set up by the network or service operator for the purpose of tracking QoS information which will be exchanged by the end-user terminals 21 and 22 as described below.

End user-terminal 21 or 22 may be any suitable terminal providing access to an Internet or an Intranet network, such as but not limited to personal computers, Personal Document Assistants (PDA), portable computers, cellular telephones, fixed telephones, Universal Mobile Telecommunications System (UMTS) terminals, for instance. In FIG. 3, user-terminal 21 and 22 are represented as two HP JORNADA type PDAs which are marketed by Hewlett-Packard Company.

It will be understood that the described techniques may be used with any kind of connection to a network, such as, but not limited to, connection via a wired LAN, infrared connection, or an 802.11 or other wireless connection, for instance.

End-user terminals 21 and 22 include means for establishing sessions through the NGN network 20 and this is accomplished by using an appropriate session initiating protocol. In the preferred embodiment, the known SIP protocol is used for establishing a session between end-user terminal 21 and service 23 (or between end-user terminal 21 and end-user 22) although, clearly, the techniques described may also be implemented in any kind of equivalent or comparable session initiating protocols. The use of the techniques with the emerging SIP protocol is clearly an advantage since SIP is becoming a well known protocol for signaling in the next generation wireless networks.

Such a session may be used for permitting all kinds of services, including, without restriction, voice, video, multimedia and instant messaging. Considering the SIP protocol, the session is established in accordance with a signaling procedure which employs a signaling plane. In accordance with the known SIP technique, this signaling plane serve to establish and terminate sessions over the network.

As known in the SIP procedure, the establishment of a session is achieved by means of a set of messages which are exchanged through the network in accordance with the SIP protocol and, more particularly, by an INVITE message which contains the SIP address of end-user terminal 22, for instance. For the sake of clarity, the contents of the SIP protocol will not be discussed in detail. However, additional references can be found in RFC3261 referred to above.

In addition to the possibility of initiating a session, user terminal 21 includes means for monitoring the quality of service of the communication during the session. This is achieved by extracting relevant information from the appropriate protocol layer supporting the transport of the media, e.g. voice, video, multimedia etc. . . . Representative parameters for such QoS information can be gathered and such QoS information is exchanged through the signaling plane of the SIP protocol in order to enable both end-user terminals 21 and 22, and also Service Level Management application 24 of the service or network operator, to have access to the same information when the session completes. To achieve this, signaling protocols are used in order to transport QoS information as measured at the session endpoints.

Figure 4:
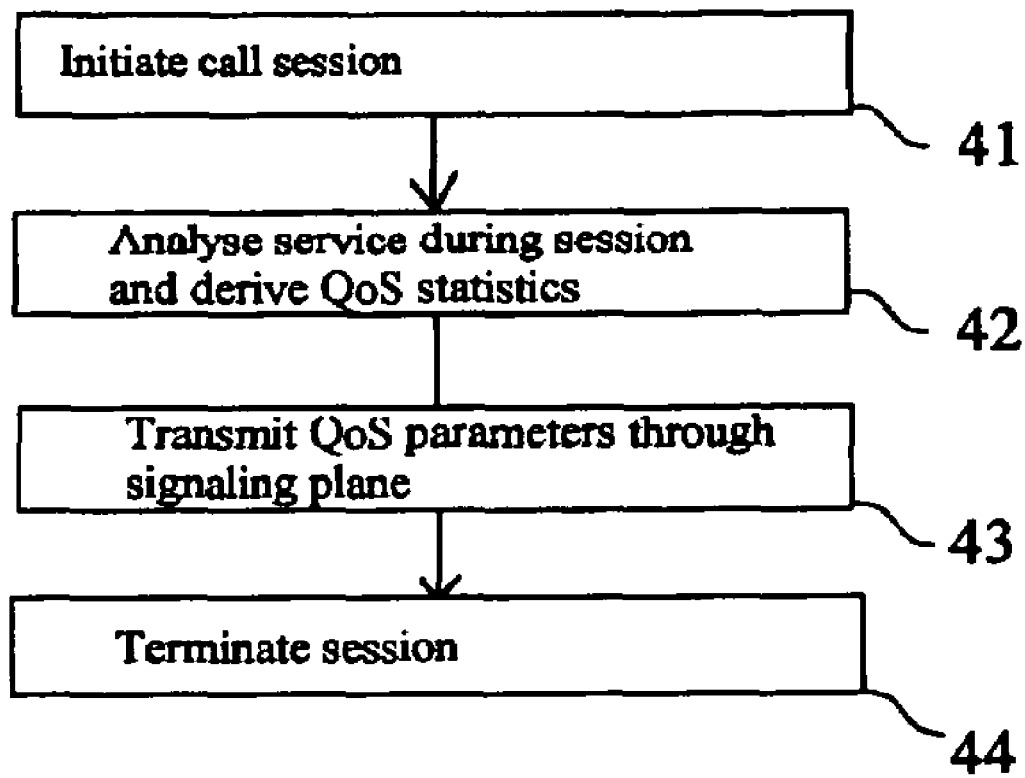
FIG. 4 is a flow chart illustrating a process for monitoring the QoS.

With respect to FIG. 4, there will now be described a process for monitoring the QoS of the communication during a session between end-user terminals 21 and 22 illustrated in FIG. 3.

The process starts with a step 41 where a call is initiated in accordance with the SIP procedure. Establishing a call for initiating a session is well understood and this will not be described in detail. This can be achieved, in accordance with the known SIP protocol by means of an INVITE message 51—in FIG. 5—which is forwarded to proxy 1 associated with end-user 21. In the preferred embodiment, QoS information corresponding to the measured time elapsed between the initial INVITE request and its corresponding response is embedded within an appropriate header of the ACK message. In this way, terminal 21 and service 23 (or terminal 22) both have access to the same QoS information during the session.

Once the session is established, the process proceeds with step 42 where the quality of the session is analysed and a number of parameters which are representative of the Quality of Service (QoS) of the communication are collected and computed. Such information may for instance include information relating to the quality of the call establishment (signaling level), the quality of the media transmission (media streaming, jitter, loss of packets) and also the quality of the service provided by server 23.

All these parameters constitute a set of QoS statistics relating to the current session, i.e. very useful information which can be used for checking compliance of the Service Level Agreement committed by the service or network operator.

The appropriate parameters which are collected and which can be generated and computed from the extracted parameters closely depend upon the media which is transported during the session and the particular type of service. In one embodiment, the session is assumed to allow transmission of voice signals and the QoS statistics relate to parameters concerning the transmission of voice signals. Clearly, appropriate adaptions can be made to implement the techniques described for any kind of other services.

In one embodiment, the Real Time Transfer Protocol (RTP) and RTP Control Protocol (RTCP) protocols are used for the purpose of transmitting voice signals over the Internet network. The process executed within end-user terminal 1 extracts from the parameters of those protocols QoS information relating to the quality of transmission, such as the average/variance of the jitter and the percentage of lost packets during the session, and such information is collected and forwarded to all the communicating parties via the signaling plane.

When the session or call terminates, in a step 44, the process executed in end-user terminal 21 transmits the QoS statistics to the service 23 or end-user terminal 22 (in accordance with the case considered) within a call termination message. In the same way, the other participating end-user terminal 22 forwards its own QoS statistics to terminal 21, so that both have access to the same QoS statistics and such information is common to the users and also to the service or network operator which can collects this information in the proxies. At the end of the call session, the QoS information can be analysed by both end-user terminals as well as by the SLA Management application 24 so that even the service provider or network operator can have a report about the QoS for the last call session and appropriate actions can be taken.

The process can therefore include processing and/or storing the QoS data measured within the end user terminal and/or extracted from received messages to produce displayable QoS parameters that have a significance to the user or in relation to a defined SLA and displaying said parameters to a user via a suitable user interface provided by the end-user terminal or SLA management application.

Preferably, the different parameters which are representative of the QoS are included within a specific field, defined by a specific header within the SIP message. While the proxies can have access to those headers—for allowing the operator to exploit this useful information—the headers are not modified by the proxies and, therefore, all the parties can be sure to receive the same QoS information.

Figure 5:
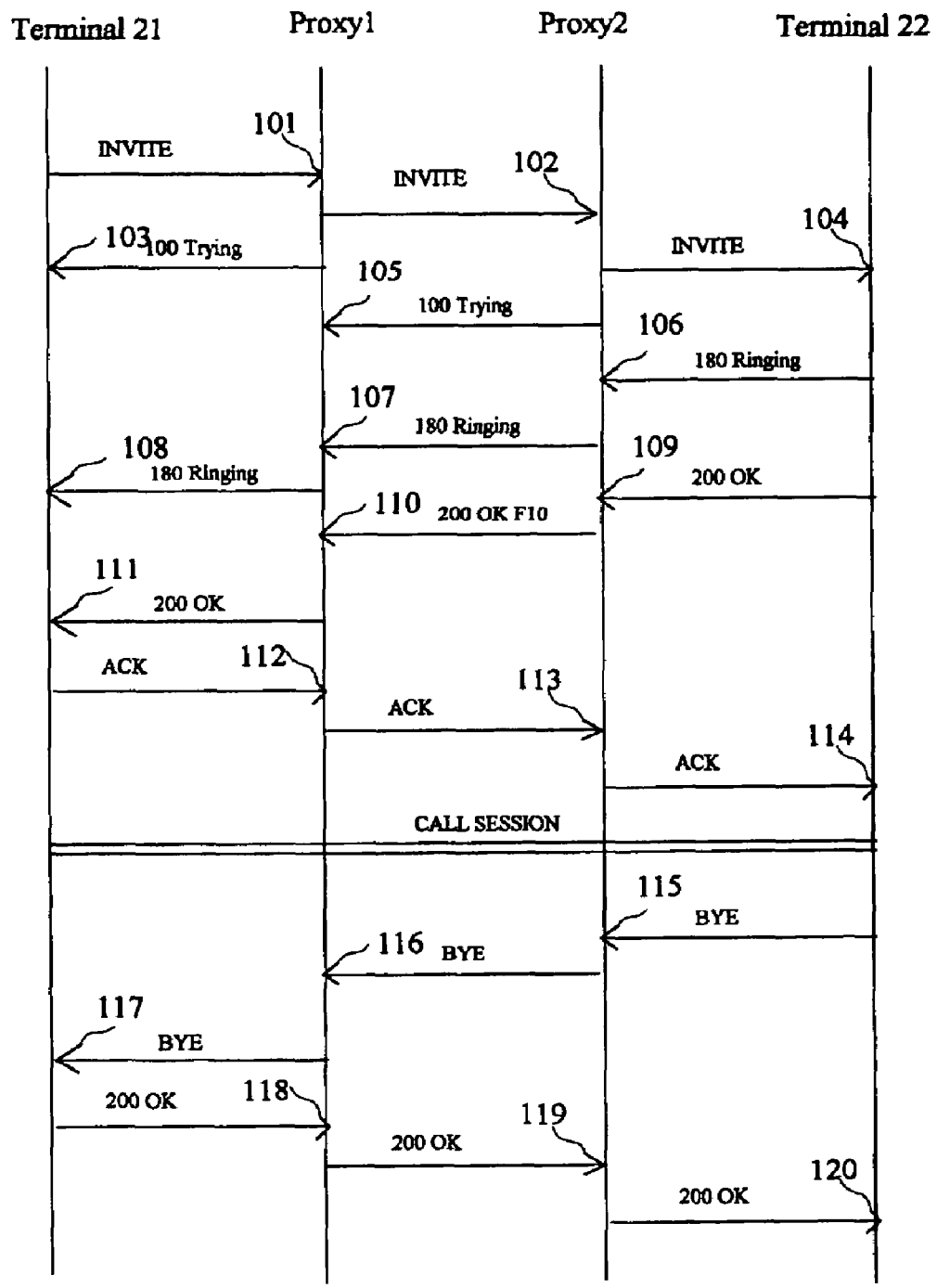
FIG. 5 illustrates the different messages which are exchanged for establishing a SIP session.

With respect to FIG. 5 there is illustrated an example of the messages which are exchanged between end-user terminal 21 and the end-user terminal 22, as well as their associated proxies. It can be seen that, in this example, terminal 21 completes a call to terminal 22 using two proxies—proxy 1 and proxy 2 (not shown in FIG. 3). The call terminates when terminal 22 disconnects by initiating a BYE message.

In accordance with the preferred embodiment, messages 112-114, 115-117 and 118-120 are used for conveying QoS information to the other party. The QoS reports may also be collected in proxy 1 and proxy 2 in order to let all parties, including end-user 21 and 22 as well as the service operator (not shown on the figure) share the same QoS information.

The following messages are exchanged:

| | |
|---|---|
| Message 101 from Terminal 21 to proxy1: | INVITE |
| Message 102 from Proxy1 to Proxy2: | INVITE |
| Message 103 from Proxy1 to Terminal 21: | 100 Trying |
| Message 104 from Proxy2 to Terminal 22: | INVITE |
| Message 105 from Proxy2 to Proxy1 | 100 Trying |
| Message 106 from Terminal 22 to Proxy2 | 180 Ringing |
| Message 107 from Proxy2 to Proxy1: | 180 Ringing |
| Message 108 from Proxy1 to Terminal 21: | 180 Ringing |
| Message 109 from Terminal 22 to Proxy2: | 200 OK |
| Message 110 from Proxy2 to Proxy1: | 200 OK |
| Message 111 from Proxy1 to Terminal 21: | 200 OK |
| Message 112 from Terminal 21 to proxy1: | ACK |
| Message 113 from Proxy1 to Proxy2: | ACK |
| Message 114 from Proxy2 to Terminal 22: | ACK |
| Message 115 from Terminal 22 to Proxy2: | BYE |
| Message 116 from Proxy2 to Proxy1: | BYE |
| Message 117 from Proxy1 to Terminal 21: | BYE |
| Message 118 from Terminal 21 to proxy1: | 200 |
| Message 119 from Proxy1 to Proxy2: | 200 |
| Message 120 from Proxy2 to Terminal 22: | 200 |

With the following examples:

Message 101
INVITE sip:UserB@there.com SIP/2.0
Via: SIP/2.0/UDP here.com:5060;branch=z9hG4bK74bf9
Max-Forwards: 70
From: BigGuy <sip:UserA@here.com>;tag=9fxced76sl
To: LittleGuy <sip:UserB@there.com>
Call-ID: 12345601@here.com
CSeq: 2 INVITE
Contact: <sip:UserA@100.101.102.103>
Content-Type: application/sdp
Content-Length: 147
v=0
o=UserA 2890844526 2890844526 IN IP4 here.com
s=Session SDP
c=IN IP4 100.101.102.103
t=0 0
m=audio 49172 RTP/AVP 0
a=rtpmap: 0 PCMU/8000
    Proxy 1 forwards the INVITE to Proxy 2. Client for A prepares to receive data on port 49172 from the network.
Message 102
INVITE sip:UserB@there.com SIP/2.0
Via: SIP/2.0/UDP ss1.wcom.com:5060; branch=z9hG4bK2d4790.1
Via: SIP/2.0/UDP here.com:5060;branch=z9hG4bK74bf9; received=100.101.102.103
Max-Forwards: 69
Record-Route: <sip:ss1.wcom.com;lr>
From: BigGuy <sip:UserA@here.com>;tag=9fxced76sl
To: LittleGuy <sip:UserB@there.com>
Call-ID: 12345601@here.com
CSeg: 2 INVITE
Contact: <sip:UserA@100.101.102.103>
Content-Type: application/sdp
Content-Length: 147
v=0
o=UserA 2890844526 2890844526 IN IP4 here.com
s=Session SDP c=IN IP4 100.101.102.103
t=0 0
m=audio 49172 RTP/AVP 0
a=rtpmap:0 PCMU/8000
    Message 103
SIP/2.0 100 Trying
Via: SIP/2.0/UDP here.com:5060;branch=z9hG4bK74bf9;
    received=100.101.102.103
From: BigGuy <sip:UserA@here.com>;tag=9fxced76sl
To: LittleGuy <sip:UserB@there.com>
Call-ID: 12345601@here.com
CSeq: 2 INVITE
Content-Length: 0
    Message 104
INVITE sip:UserB@110.111.112.113 SIP/2.0
Via: SIP/2.0/UDP ss2.wcom.com:5060;
    branch=z9hG4bK721e418c4.1
Via: SIP/2.0/UDP ss1.wcom.com:5060;
    branch=z9hG4bK2d4790.1;received=1.2.3.4
Via: SIP/2.0/UDP here.com:5060;branch=z9hG4bK74bf9;
    received=100.101.102.103
Max-Forwards: 68
Record-Route: <sip:ss2.wcom.com;lr>, <sip:
    ss1.wcom.com;lr>
From: BigGuy <sip:UserA@here.com>;tag=9fxced76sl
To: LittleGuy <sip:UserB@there.com>
Call-ID: 12345601@here.com
CSeq: 2 INVITE
Contact: <sip:UserA@100.101.102.103>
Content-Type: application/sdp
Content-Length: 147
v=0
o=UserA 2890844526 2890844526 IN IP4 here.com
s=Session SDP
c=IN IP4 100.101.102.103
t=0 0
m=audio 49172 RTP/AVP 0
a=rtpmap: 0 PCMU/8000
    Message 105
SIP/2.0 100 Trying
Via: SIP/2.0/UDP ss1.wcom.com:5060;
    branch=z9hG4bK2d4790.1;received=1.2.3.4
Via: SIP/2.0/UDP here.com:5060;branch=z9hG4bK74bf9;
    received=100.101.102.103
From: BigGuy <sip:UserA@here.com>;tag=9fxced76sl
To: LittleGuy <sip:UserB@there.com>
Call-ID: 12345601@here.com
CSeq: 2 INVITE
Content-Length: 0
    Message 106
SIP/2.0 180 Ringing
Via: SIP/2.0/UDP ss2.wcom.com:5060;
    branch=z9hG4bK721e418c4.1;received=2.3.4.5
Via: SIP/2.0/UDP ss1.wcom.com:5060;
    branch=z9hG4bK2d4790.1;received=1.2.3.4
Via: SIP/2.0/UDP here.com:5060;branch=z9hG4bK74bf9;
    received=100.101.102.103
Record-Route: <sip:ss2.wcom.com;lr>, <sip:
    ss1.wcom.com;lr>
From: BigGuy <sip:UserA@here.com>;tag=9fxced76sl
To: LittleGuy <sip:UserB@there.com>;tag=314159
Call-ID: 12345601@here.com
Contact: <sip:UserB@110.111.112.113>
CSeq: 2 INVITE
Content-Length: 0
    Message 107
SIP/2.0 180 Ringing
Via: SIP/2.0/UDP ss1.wcom.com:5060;
    branch=z9hG4bK2d4790.1;received=1.2.3.4
Via: SIP/2.0/UDP here.com:5060;branch=z9hG4bK74bf9;
    received=100.101.102.103
Record-Route: <sip:ss2.wcom.com;lr>, <sip:
    ss1.wcom.com;lr>
From: BigGuy <sip:UserA@here.com>;tag=9fxced76sl
To: LittleGuy <sip:UserB@there.com>;tag=314159
Call-ID: 12345601@here.com
Contact: <sip:UserB@110.111.112.113>
CSeq: 2 INVITE
Content-Length: 0
    Message 108
SIP/2.0 180 Ringing
Via: SIP/2.0/UDP here.com:5060;branch=z9hG4bK74bf9;
    received=100.101.102.103
Record-Route: <sip:ss2.wcom.com;lr>, <sip:
    ss1.wcom.com;lr>
From: BigGuy <sip:UserA@here.com>;tag=9fxced76sl
To: LittleGuy <sip:UserB@there.com>;tag=314159
Call-ID: 12345601@here.com
Contact: <sip:UserB@110.111.112.113>
CSeq: 2 INVITE
Content-Length: 0
    Message 109
SIP/2.0 200 OK
Via: SIP/2.0/UDP ss2.wcom.com:5060;
    branch=z9hG4bK721e418c4.1;received=2.3.4.5
Via: SIP/2.0/UDP ss1.wcom.com:5060;
    branch=z9hG4bK2d4790.1;received=1.2.3.4
Via: SIP/2.0/UDP here.com:5060;branch=z9hG4bK74bf9;
    received=100.101.102.103
Record-Route: <sip:ss2.wcom.com;lr>, <sip:
    ss1.wcom.com;lr>
From: BigGuy <sip:UserA@here.com>;tag=9fxced76sl
To: LittleGuy <sip:UserB@there.com>;tag=314159
Call-ID: 12345601@here.com
CSeq: 2 INVITE
Contact: <sip:UserB@110.111.112.113>
Content-Type: application/sdp
Content-Length: 147
v=0
o=UserB 2890844527 2890844527 IN IP4 there.com
s=Session SDP
c=IN IP4 110.111.112.113
t=0 0
m=audio 3456 RTP/AVP 0
a=rtpmap:0 PCMU/8000
    Message 110
SIP/2.0 200 OK
Via: SIP/2.0/UDP ss1.wcom.com:5060;
    branch=z9hG4bK2d4790.1;received=1.2.3.4
Via: SIP/2.0/UDP here.com:5060;branch=z9hG4bK74bf9;
    received=100.101.102.103
Record-Route: <sip:ss2.wcom.com;lr>, <sip:
    ss1.wcom.com;lr>
From: BigGuy <sip:UserA@here.com>;tag=9fxced76sl
To: LittleGuy <sip:UserB@there.com>;tag=314159
Call-ID: 12345601@here.com
CSeq: 2 INVITE
Contact: <sip:UserB@110.111.112.113>
Content-Type: application/sdp
Content-Length: 147
v=0
o=UserB 2890844527 2890844527 IN IP4 there.com
s=Session SDP
c=IN IP4 110.111.112.113 t=0 0
m=audio 3456 RTP/AVP 0
a=rtpmap:0 PCMU/8000
    Message 111
SIP/2.0 200 OK
Via: SIP/2.0/UDP here.com:5060;branch=z9hG4bK74bf9; received=100.101.102.103
Record-Route: <sip:ss2.wcom.com;lr>, <sip:ss1.wcom.com;lr>
From: BigGuy <sip:UserA@here.com>;tag=9fxced76sl
To: LittleGuy <sip:UserB@there.com>;tag=314159
Call-ID: 12345601@here.com
CSeq: 2 INVITE
Contact: <sip:UserB@110.111.112.113>
Content-Type: application/sdp
Content-Length: 147
v=0
o=UserB 2890844527 2890844527 IN IP4 there.com
s=Session SDP
c=IN IP4 110.111.112.113
t=0 0
m=audio 3456 RTP/AVP 0
a=rtpmap:0 PCMU/8000
    Message 112
ACK sip:UserB@110.111.112.113 SIP/2.0
Via: SIP/2.0/UDP here.com:5060;branch=z9hG4bK74bf9
Max-Forwards: 70
Route: <sip:ss1.wcom.com;lr>, <sip:ss2.wcom.com;lr>
From: BigGuy <sip:UserA@here.com>;tag=9fxced76sl
To: LittleGuy <sip:UserB@there.com>;tag=314159
Call-ID: 12345601@here.com
CSeq: 2 ACK
QoS-Report: domain=signalling;i-100=753ms;i-180=945ms
Content-Length: 0

In this message, User A has inserted a QoS-Report header to provide statistics on the call setup. The report is related to the signalling domain (domain=signalling) and two measurements are provided: the time between the INVITE and the 100 Trying, and the time between the INVITE and the 180 Ringing. Using this information, Proxy 1 may update a Call Details Record (CDR) by conventional means that need not be described herein. The QoS-Report header is forwarded unmodified.

Message 113
ACK sip:UserB@110.111.112.113 SIP/2.0
Via: SIP/2.0/UDP ss1.wcom.com:5060; branch=z9hG4bK2d4790.1
Via: SIP/2.0/UDP here.com:5060;branch=z9hG4bK74bf9; received=100.101.102.103
Max-Forwards: 69
Route: <sip:ss2.wcom.com;lr>
From: BigGuy <sip:UserA@here.com>;tag=9fxced76sl
To: LittleGuy <sip:UserB@there.com>;tag=314159
Call-ID: 12345601@here.com.
CSeq: 2 ACK
QoS-Report: domain=signalling;i-100=753ms;i-180=945ms
Content-Length: 0
    Message 114
ACK sip:UserB@110.111.112.113 SIP/2.0
Via: SIP/2.0/UDP ss2.wcom.com:5060; branch=z9hG4bK721e418c4.1
Via: SIP/2.0/UDP ss1.wcom.com:5060; branch=z9hG4bK2d4790.1;received=1.2.3.4
Via: SIP/2.0/UDP here.com:5060;branch=z9hG4bK74bf9; received=100.101.102.103
Max-Forwards: 68
From: BigGuy <sip:UserA@here.com>;tag=9fxced76sl
To: LittleGuy <sip:UserB@there.com>;tag=314159
Call-ID: 12345601@here.com
CSeq: 2 ACK
QoS-Report: domain=signalling;i-100=753ms;i-180=945ms
Content-Length: 0

RTP streams are established between A and B.
User B hangs up with user A.
    Message 115
BYE sip:UserA@100.101.102.103 SIP/2.0
Via: SIP/2.0/UDP there.com:5060; branch=z9hG4bKnashds7
Max-Forwards: 70
Route: <sip:ss2.wcom.com;lr>, <sip:ss1.wcom.com;lr>
From: LittleGuy <sip:UserB@there.com>;tag=314159
To: BigGuy <sip:UserA@here.com>;tag=9fxced76sl
Call-ID: 12345601@here.com
CSeq: 1 BYE
QoS-Report: domain=media;c=IN IP4 110.111.112.113; m=audio 3456 RTP/AVP 0;loss=1.79%;jitter=24ms
Content-Length: 0

The call is now terminated, and User B has media statistics available for transmission to its outbound proxy (Proxy 2). Therefore, User B generates a QoS-Report header for the media domain, copies the media stream identification information, and provides loss and jitter measurements. Proxy 2 may then update its CDR information.

Message 116
BYE sip:UserA@100.101.102.103 SIP/2.0
Via: SIP/2.0/UDP ss2.wcom.com:5060; branch=z9hG4bK721e418c4.1
Via: SIP/2.0/UDP there.com:5060; branch=z9hG4bKnashds7;received=110.111.112.113
Max-Forwards: 69
Route: <sip:ss1.wcom.com;lr>
From: LittleGuy <sip:UserB@there.com>;tag=314159
To: BigGuy <sip:UserA@here.com>;tag=9fxced76sl
Call-ID: 12345601@here.com
CSeq: 1 BYE
QoS-Report: domain=media;c=IN IP4 110.111.112.113; m=audio 3456 RTP/AVP 0;loss=1.79%;jitter=24ms
Content-Length: 0
    Message 117
BYE sip:UserA@100.101.102.103 SIP/2.0
Via: SIP/2.0/UDP ss1.wcom.com:5060; branch=z9hG4bK2d4790.1
Via: SIP/2.0/UDP ss2.wcom.com:5060; branch=z9hG4bK721e418c4.1;received=2.3.4.5
Via: SIP/2.0/UDP there.com:5060; branch=z9hG4bKnashds7;received=110.111.112.113
Max-Forwards: 68
From: LittleGuy <sip:UserB@there.com>;tag=314159
To: BigGuy <sip:UserA@here.com>;tag=9fxced76sl
Call-ID: 12345601@here.com
CSeq: 1 BYE
QoS-Report: domain=media;c=IN IP4 110.111.112.113; m=audio 3456 RTP/AVP 0;loss=1.79%;jitter=24ms
Content-Length: 0
    Message 118
SIP/2.0 200 OK
Via: SIP/2.0/UDP ss1.wcom.com:5060; branch=z9hG4bK2d4790.1;received=1.2.3.4
Via: SIP/2.0/UDP ss2.wcom.com:5060; branch=z9hG4bK721e418c4.1;received=2.3.4.5

Via: SIP/2.0/UDP there.com:5060;
   branch=z9hG4bKnashds7;received=110.111.112.113
From: LittleGuy <sip:UserB@there.com>;tag=314159
To: BigGuy <sip:UserA@here.com>;tag=9fxced76sl
Call-ID: 12345601@here.com
CSeq: 1 BYE
QoS-Report: domain=media;c=IN IP4 110.111.112.113;
   m=audio 3456 RTP/AVP 0;loss=0.23%;jitter=31ms
Content-Length: 0
User A sends its media statistics to its outbound proxy (Proxy 1) in a similar way User B did before.
Message 119
SIP/2.0 200 OK
Via: SIP/2.0/UDP ss2.wcom.com:5060;
   branch=z9hG4bK721e418c4.1;received=2.3.4.5
Via: SIP/2.0/UDP there.com:5060;
   branch=z9hG4bKnashds7;received=100.101.102.103
From: LittleGuy <sip:UserB@there.com>;tag=314159
To: BigGuy <sip:UserA@here.com>;tag=9fxced76sl
Call-ID: 12345601@here.com
CSeq: 1 BYE
QoS-Report: domain=media;c=IN IP4 110.111.112.113;
   m=audio 3456 RTP/AVP 0;loss=0.23%;jitter=31ms
Content-Length: 0
Message 120
SIP/2.0 200 OK
Via: SIP/2.0/UDP there.com:5060;branch=z9h
   G4bKnashds7;received=110.111.112.113
From: LittleGuy <sip:UserB@there.com>;tag=314159
To: BigGuy <sip:UserA@here.com>;tag=9fxced76sl
Call-ID: 12345601@here.com
CSeq: 1 BYE
QoS-Report: domain=media;c=IN IP4 110.111.112.113;
   m=audio 3456 RTP/AVP 0;loss=0.23%;jitter=31ms
Content-Length: 0

The QoS information is carried in the header of a SIP message, as for the SDP RFC 2327, in a manner similar to that used for a document attachment for an email message, or a web page that is carried in an Hyper Text Transfer Protocol (HTTP) message. The advantage of inserting the QoS information within the header instead of using the body of the message is substantial since the header remains unaffected when the message is processed through the proxies and, therefore, the QoS information remains intact.

Preferably, QoS information is collected during the whole session and is then transmitted at the end of the transaction in a SIP message which is used for terminating the call.

In the example shown in FIG. 5, QoS statistics for terminal 22 are conveyed via the message (BYE) message 115 and collected by Proxy2. The QoS statistics for terminal 21 is carried by message 118 and collected by Proxy1.

In this embodiment, such statistics information comprise information relating to the signaling domain and information relating to the media domain.

Regarding the signaling domain the following parameters can be used, or instance: the i-100, i-180 and r-200.

The i-100 parameter corresponds to the time elapsed between an INVITE and the corresponding 100 Trying message. It is expressed in milliseconds. This gives an estimate of the time it takes between the UAC initiating a call and the first proxy actually forwarding it. This parameter is sent in the ACK message 112 that follows the 200 OK message 111 for the INVITE 101.

The i-180 parameter measures the time elapsed between an INVITE and the corresponding 180 Ringing message 108. It is expressed in milliseconds. This value represents the time a user has to wait between initiating a call, and receiving a confirmation that the remote party, is being alerted. This parameter is sent in the ACK that follows the 200 OK for the INVITE.

The r-200 parameter evaluates the time needed for registration of the UAC. It is the time between the REGISTER message and the corresponding 200 OK. This parameter is sent in the 200 OK related to the REGISTER, Belonging to the media domain are parameters that are closely related to the quality of transmission of the media. QoS information relating to this domain is transmitted at the end of the call, that is to say in the BYE message 115 or the 200 OK message 118. Parameters such as the total number of lost packets and the jitter are reported in this way:

QoS-Report: domain=signalling; i-100=753ms; i-180=945 ms

Qog-Report: domain=media; c=YN IP4=10.0.0.1 ;m=audio 1970 RTP/AVP 0,
loss=0.67%;jitter=29ms C and m parameters are used for identifying the type of media stream for which QoS statistics are being provided. Preferably, they can be directly derived from the contents of the SDP message.

It can be seen that the above described techniques provide a simple mechanism that enables the different parties to a service agreement to share the same information about the quality of service in order to check compliance of the service obtained with the service level agreements (SLA) involved. However, the technique also has other advantages. The QoS information which is shared between the end-user terminals exactly corresponds to the quality of the service which is actually measured by the end user terminal. The process is not intrusive since no specific agent has to be deployed within the network—a substantial advantage which respect to the traditional probes, active and passive. The measurement of the QoS does not generate additional traffic. It can also be seen that the process which was described above does not need any dedicated protocol since it can take support from the existing signaling protocols. Finally, the process can provide privacy since embodiments can be realised in which the user is given the option not to transmit any QoS information if this is inappropriate or undesirable.

The invention has been particularly described in relation to voice services, but it will be understood the above techniques can be applied to any kind of media, such as video and any kind of applications such as multimedia services.

The invention claimed is:

1. Process for monitoring the quality of service of a communication through a communication network, said process being executed in a end-user terminal and comprising the steps of:
   establishing a session between a first end-user terminal and a second end-user terminal via a signaling plane using a session initiation protocol;
   monitoring the quality of service of the communication during said session;
   transmitting information representative of said quality of service during said session using said signaling plane, wherein the QoS information is transmitted within the header of a session initiation protocol message, so that all parties share the same information, wherein said information representative of said quality of service comprises signaling parameters and media transmission quality parameters, said signaling parameters including a parameter which is representative of the time between one invite and the resulting ringing signal for this invite.

2. A process according to claim 1 wherein said session is used for transmitting voice services through at least a first and a second proxy and that said signaling parameters include a parameter representative of the time taken between one invite is transmitted to said first proxy and said proxy forwards it to said second proxy.

3. A process according to claim 1 wherein said session is used for transmitting voice services and that said quality of service comprises parameters representative of the quality of transmission of voice signals.

4. A process according to claim 3 wherein the voice is transmitted through RTP and RTCP protocols and that said quality of service comprises parameters extracted from said RTCP protocol by an end-user process.

5. Process according to claim 3 wherein said quality of service comprises parameters representative of the jitter of the voice transmission.

6. Process according to claim 3 wherein said quality of service comprises parameters representative of the loss of packets in the voice transmission.

7. Process according to claim 1 wherein said session is used for transmitting video services and that said quality of service comprises parameters representative of the quality of transmission of video signals.

8. Process according to claim 1 wherein said first end-user communicates with a service in lieu of a second end-user.

9. Process according to claim 1 wherein said terminal is one of a personal computer, a Personal Document Assistant, a portable computer, a cellular telephone, a fixed telephone or a Universal Mobile Telecommunications System terminal.

10. Process for monitoring the quality of service of a communication through a communication network, said process being executed in a end-user terminal and comprising the steps of:
  establishing a session between a first end-user terminal and a second end-user terminal via a signaling plane using a session initiation protocol;
  monitoring the quality of service of the communication during said session;
  transmitting information representative of said quality of service during said session using said signaling plane, wherein the QoS information is transmitted within the header of a session initiation protocol message, so that all parties share the same information, and further wherein said session is used for transmitting voice services through at least a first and a second proxy and that said QoS information include a parameter representative of the time taken between one invite is transmitted to said first proxy and said proxy forwards it to said second proxy.

11. A process according to claim 10 wherein said QoS information further comprises media transmission quality parameters.

12. A process according to claim 10 wherein said session is used for transmitting voice services and that said quality of service comprises parameters representative of the quality of transmission of voice signals.

13. A process according to claim 12 wherein the voice is transmitted through RTP and RTCP protocols and that said quality of service comprises parameters extracted from said RTCP protocol by an end-user process.

14. Process according to claim 13 wherein said quality of service comprises parameters representative of the jitter of the voice transmission.

15. Process according to claim 13 wherein said quality of service comprises parameters representative of the loss of packets in the voice transmission.

16. Process according to claim 10 wherein said session is used for transmitting video services and that said quality of service comprises parameters representative of the quality of transmission of video signals.

17. Process according to claim 10 wherein a first end-user communicates with a service in lieu of a second end-user.

18. Process according to claim 10 wherein said end-user terminal is one of a personal computer, a Personal Document Assistant, a portable computer, a cellular telephone, a fixed telephone or a Universal Mobile Telecommunications System terminal.

* * * * *